March 28, 1967 N. L. WYKOFF 3,311,150
TRACTION DEVICE WHEELED VEHICLES
Filed May 10, 1965 6 Sheets-Sheet 1

INVENTOR.
NORMAN LOWELL WYKOFF
BY
ATTORNEYS.

March 28, 1967 — N. L. WYKOFF — 3,311,150
TRACTION DEVICE WHEELED VEHICLES
Filed May 10, 1965 — 6 Sheets-Sheet 2

INVENTOR.
NORMAN LOWELL WYKOFF
BY
ATTORNEYS.

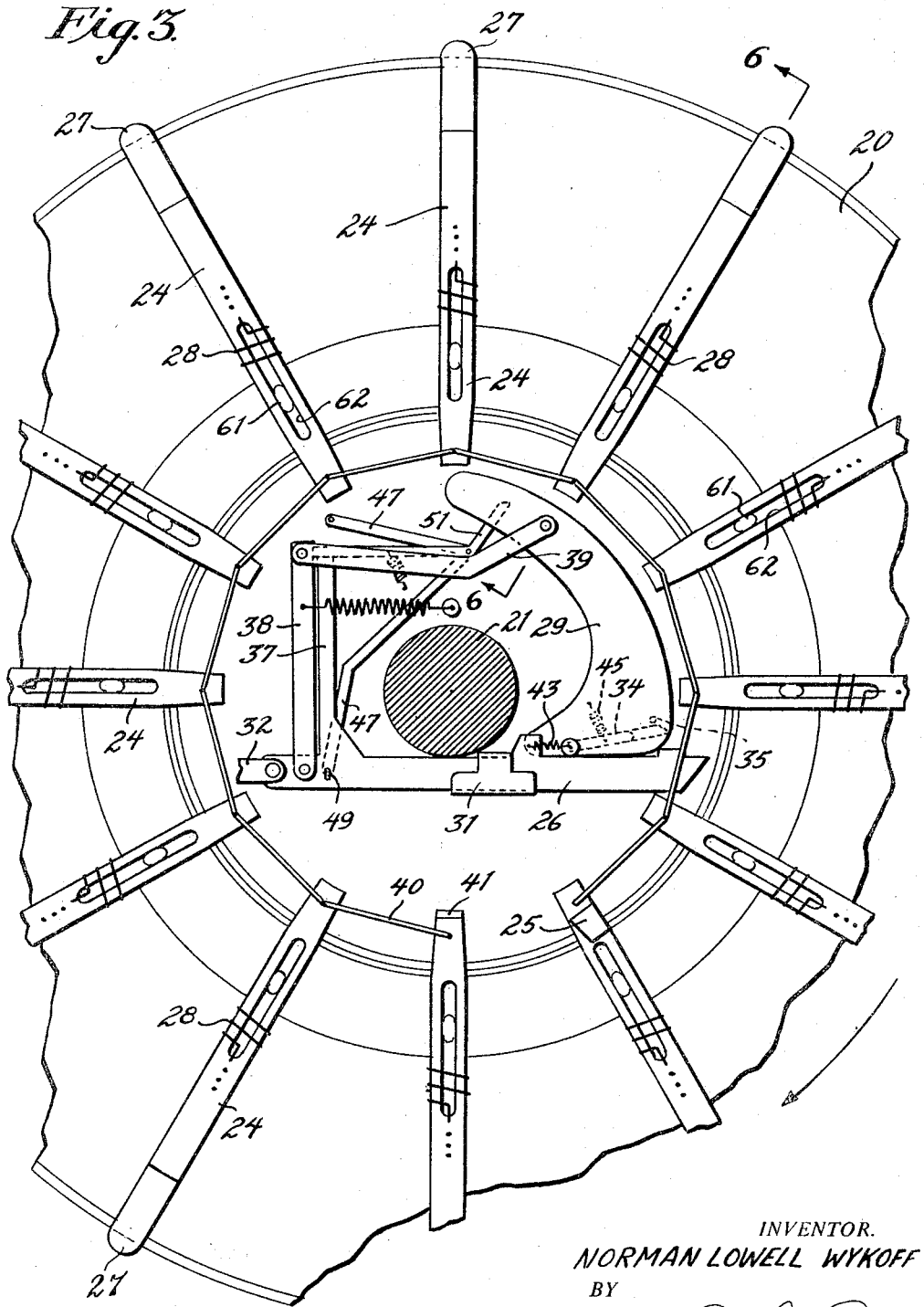

INVENTOR.
NORMAN LOWELL WYKOFF
BY
ATTORNEYS.

INVENTOR.
NORMAN LOWELL WYKOFF

March 28, 1967  N. L. WYKOFF  3,311,150
TRACTION DEVICE WHEELED VEHICLES
Filed May 10, 1965  6 Sheets-Sheet 6
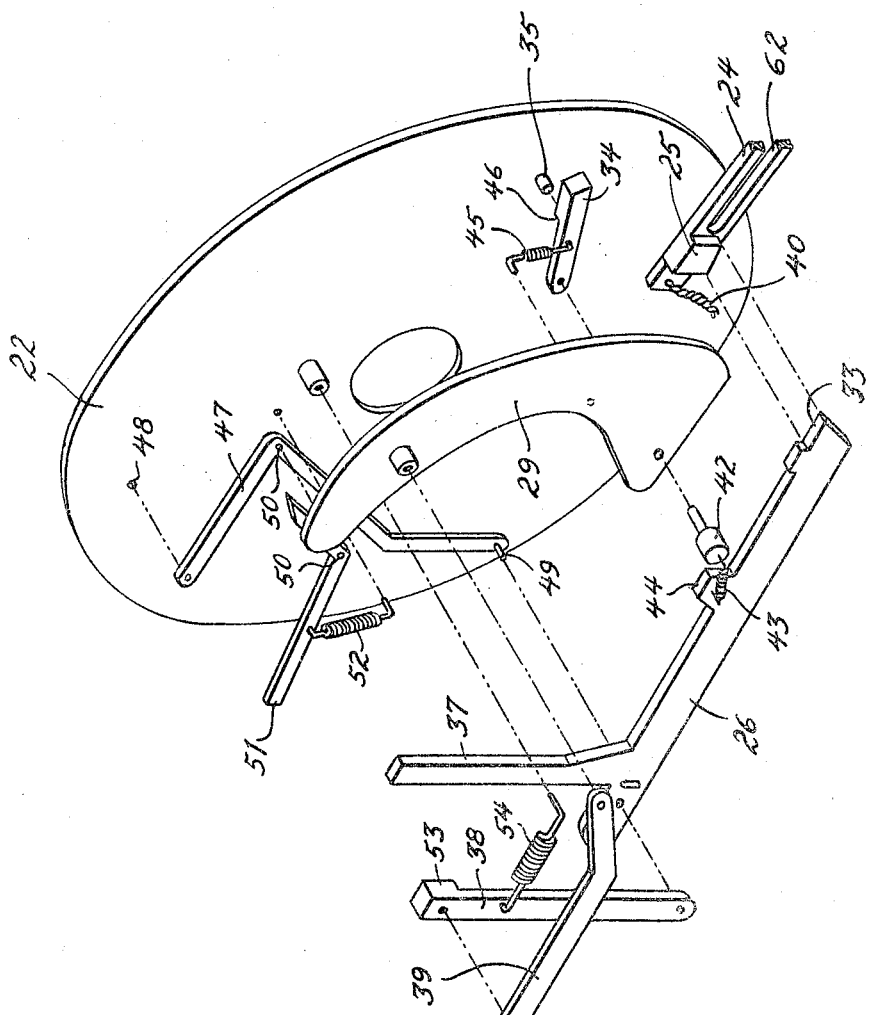
Fig. 12.
INVENTOR.
NORMAN LOWELL WYKOFF
BY
ATTORNEYS.

United States Patent Office 3,311,150
Patented Mar. 28, 1967

3,311,150
TRACTION DEVICE WHEELED VEHICLES
Norman Lowell Wykoff, Elizabethtown, Pa.
(Box 376, Hanover, Pa. 47234)
Filed May 10, 1965, Ser. No. 454,508
2 Claims. (Cl. 152—214)

This invention relates to a traction device for automobiles, trucks, and other wheeled vehicles and more particularly to a traction device which can be put into service from within the vehicle while it is in motion.

There has been a particular need for a traction system for automobiles and the like which can be conveniently and instantaneously put into service without the necessity of crawling under the vehicle to attach appropriate traction devices such as chains. Accordingly, it is an object of this invention to provide such a traction device which can be engaged into operation and disengaged from the same by an operator of a motor vehicle while remaining inside the vehicle.

It is an additional object of this invention to provide a device which is capable of affording instantaneous traction to moving vehicles while running across a difficult driving hazard such as an icy spot.

It is a further object of this invention to provide a device which can equally be removed from operation as conveniently as it is put into service.

Another object of this invention is to provide a device which will in no way interfere with the normal operation of the vehicle when the device is not in use and which will be capable of remaining as a permanent fixture on the vehicle, thus always being available for service regardless of the time of year.

It is an additional object of this invention to provide a device which can be placed into service by any person regardless of physical handicap the only ability needed being no more than that needed to engage a hand brake.

These objects are accomplished by providing a device consisting essentially of a series of L-shaped traction arms slidably mounted on a circular rim which rim is fastened concentrically with the wheel preferably on its inner side. The arms extend out and over the tread surface of the tires and are held in contact with the tire, rotating with the same when in operative position thus affording the traction elements. The arms are brought into and out of contact with the tread surface by a mechanism activated by the mere movement of a lever by the operator within the vehicle itself while it is in motion. The mechanism also stacks the arms up along the circular rim adjacent one another and out of contact with the tire when it is desired to place the element in a non-operating position, thereby avoiding any interference with the normal operation of the vehicle wheel.

The device will greatly promote safety as many motorists refuse to use chains except in the severest weather conditions because of the consequent difficulty of crawling into the snow to mount them. With this device there is no difficulty and the traction elements will always be available and can conveniently be put into use no matter what the prevailing weather conditions. In addition they can be engaged while driving at normal speeds providing increased stopping power on slick surfaces. The device is constructed so that wear will be at a minimum, the system expending no wear while not operating and very little wear when in use from the snow and ice that it may be used on.

Other objects and features will be apparent from the following description of the drawings wherein like members designate like parts.

FIGURE 3 shows the position of all the traction arms when the unit is in operation.

FIGURE 8 is an enlarged fragmentary top view of the mechanism shown in FIGURE 7 the view taken along the lines 8—8 of FIGURE 1 showing the relationship between the mechanism and the engaging shoe.

Figure 1:
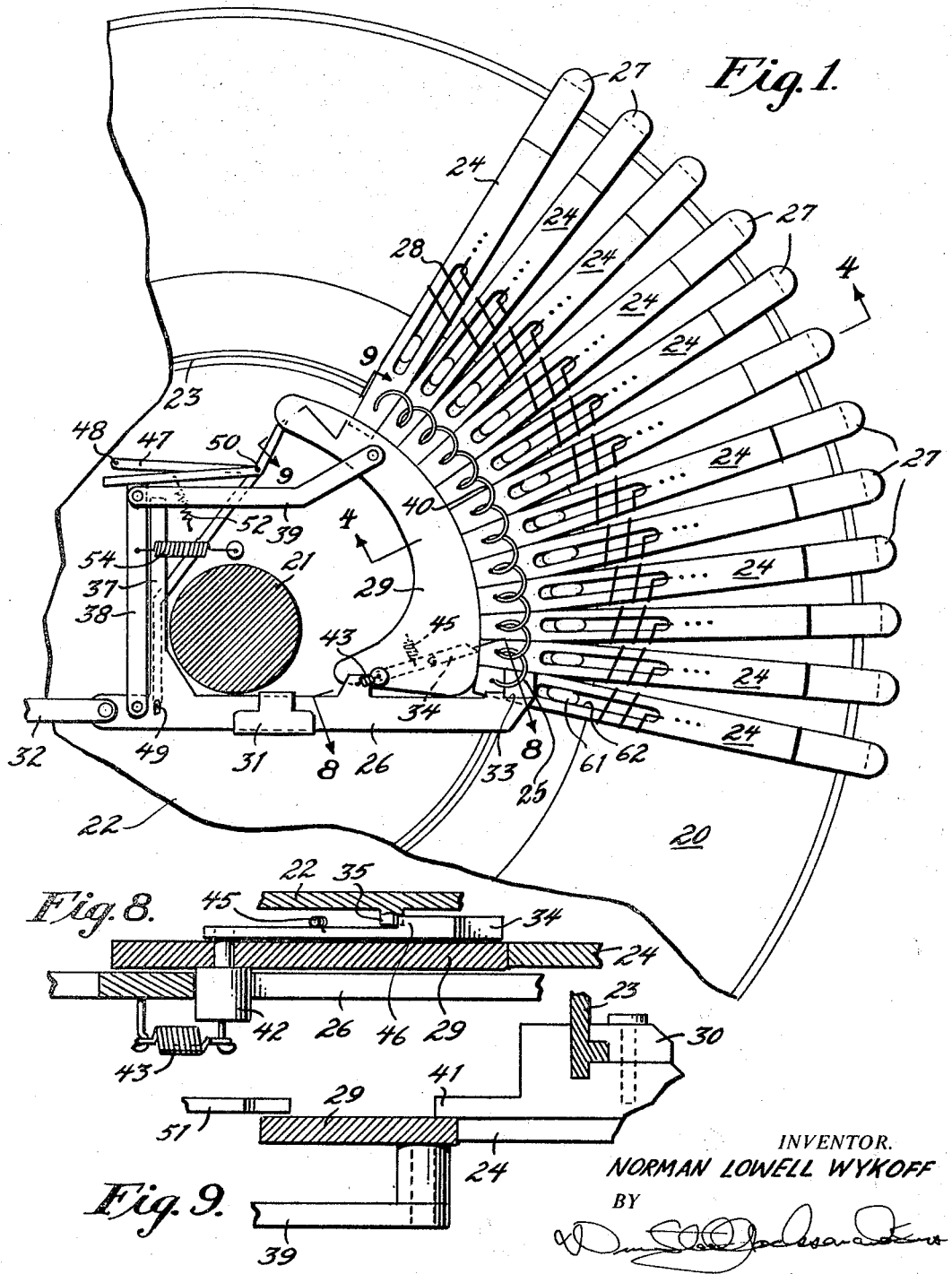
FIGURE 1 is a full view of the traction device looking toward the inner side of the left rear tire showing the traction arms or elements in an inoperative or storage position.
Figure 7:
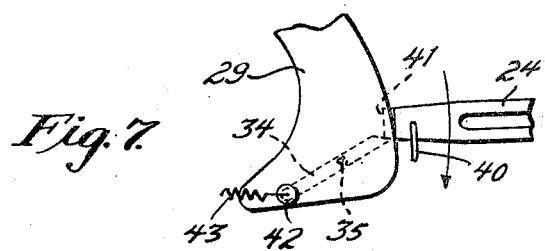
FIGURE 7 is an enlarged fragmentary view of the mechanism for releasing the engaging shoe, allowing it to be pulled back to prevent it from interfering with the traction arms while the unit is in operation.
Figure 11:
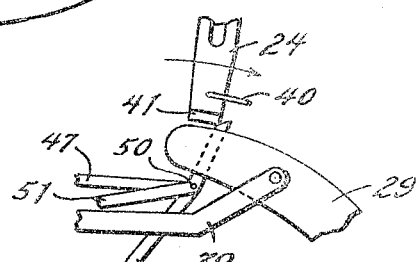

FIGURE 9 is an enlarged fragmentary view taken substantially along the line 9—9 of FIGURE 1 showing the extension on the arm mount used to trip the lever shown in FIGURES 7 and 8 and the lever shown in FIGURES 9 and 11.

Figure 10:
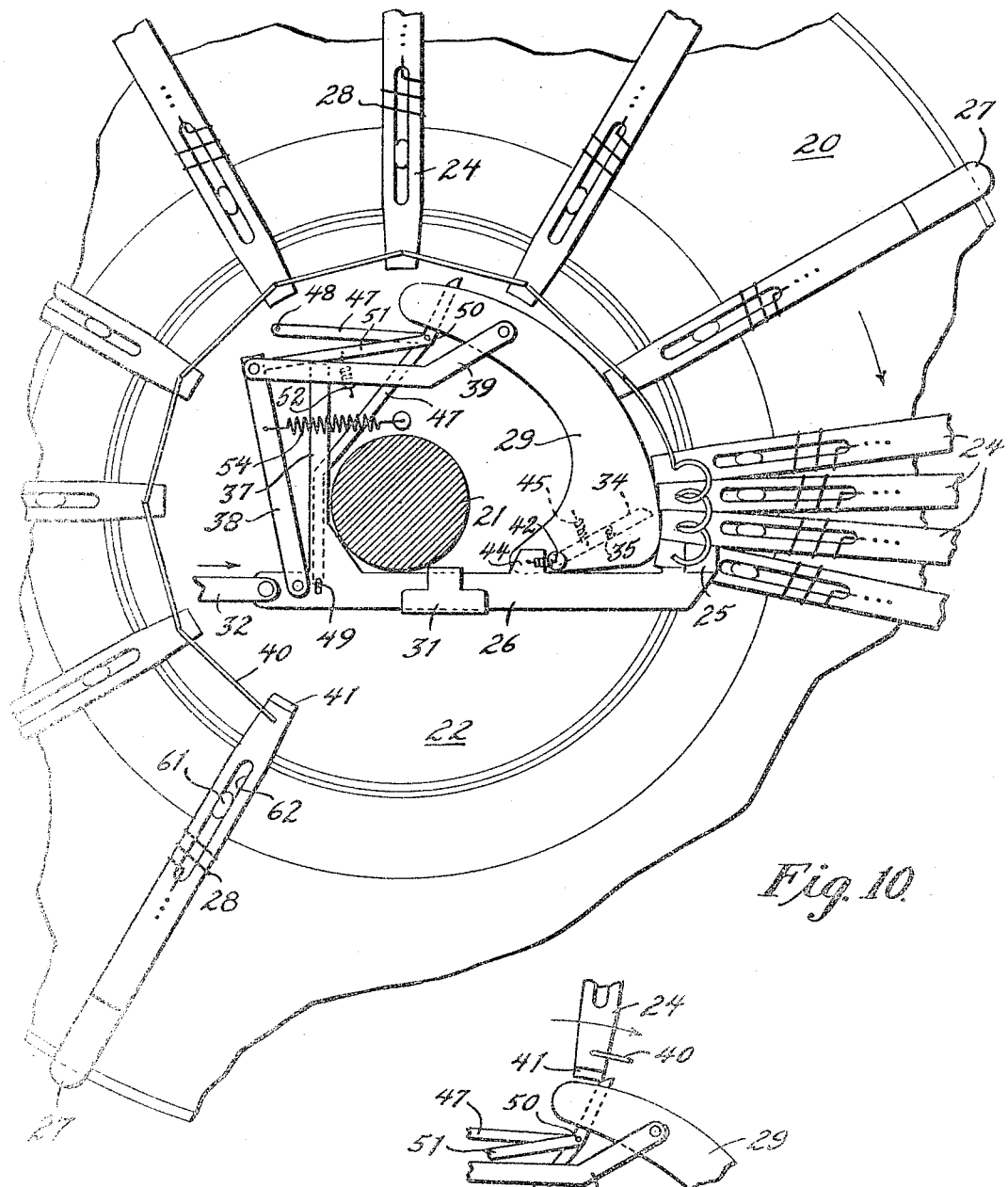

FIGURE 10 shows the traction arms being stacked up in a storage position.

FIGURE 11 is an enlarged fragmentary view showing the mechanism for bringing the upper end of the engaging shoe forward to keep the arms off the tire surface while they are in a storage position.

FIGURE 12 is a perspective view of the operating or control mechanisms of the traction device showing the spacial relationship between the various parts.

As stated above, the traction device consists of a number of L shaped traction arms suitably made of steel placed across the tread surface of the driving wheels of a motor vehicle, with the necessary means for engaging and disengaging these traction arms from operation. For passenger size automobiles, twelve traction arms have been found to be sufficient but depending on the size of the tire, more or less, can be used. These arms are designed to function as chains when in engagement but have the unique advantage in that they can be engaged and disengaged from within the car by the mere movement of a lever and one rotation of the rear wheel of the vehicle. The system can be activated while the vehicle is stationary, the arms becoming fully engaged after only 1 revolution or it may be activated and the arms engaged while the vehicle is in motion traveling in either a forward or backward direction regardless of the speed of the vehicle. It is to be noted that the axle of a vehicle is not functioning as a fulcrum in this invention in obtaining movement of the vehicle with these traction devices, but rather the tire itself is being used in the same manner that chains would be used.

Figure 4:
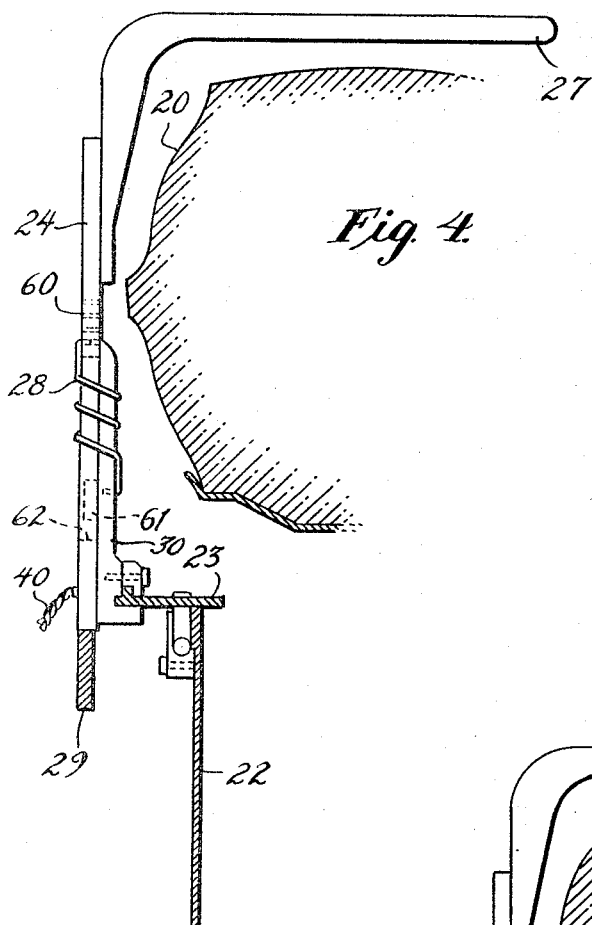
FIGURE 4 is an enlarged sectional view taken along the lines 4—4 of FIGURE 1 showing a traction arm in the storage position.

Referring now to the drawings and in particular to FIGURE 1, the traction device is designed to fit around the tire 20 rotating about axle 21. The device is conveniently shown here mounted on the inner side of the left rear tire of an automobile. To provide the necessary traction to a conventional passenger vehicle, a device would have to be mounted to both the left and right rear tires. Alternatively they may be mounted on the outer side of the tire. Attached to the axle housing is a circular plate 22 having a circular guiding member 23 mounted around its circumference as shown in FIGURE 4. The system may alternatively be mounted on the brake backing plate.

With these types of attachment, no part of the system is in motion when the unit is disengaged from operation.

Slidably mounted on the guiding member 23 are twelve traction arms 24. The first of these arms includes a raised portion or knob 25 which rides against the bar 26 which bar holds that arm and the remaining arms behind it in storage or inoperative position. The remaining traction arms are identical in design, all the arms being bevelled at their inner ends so that they will fan out around the circumference of the tire while they are in a storage position. The arms include extension 27 which rides up and over the tread surface of the tire. They are biased toward the axle by springs 28 which are wrapped around the shank of the arm and fastened to arm mount 30 as more fully described in the discussion of FIGURE 4.

Figure 2:
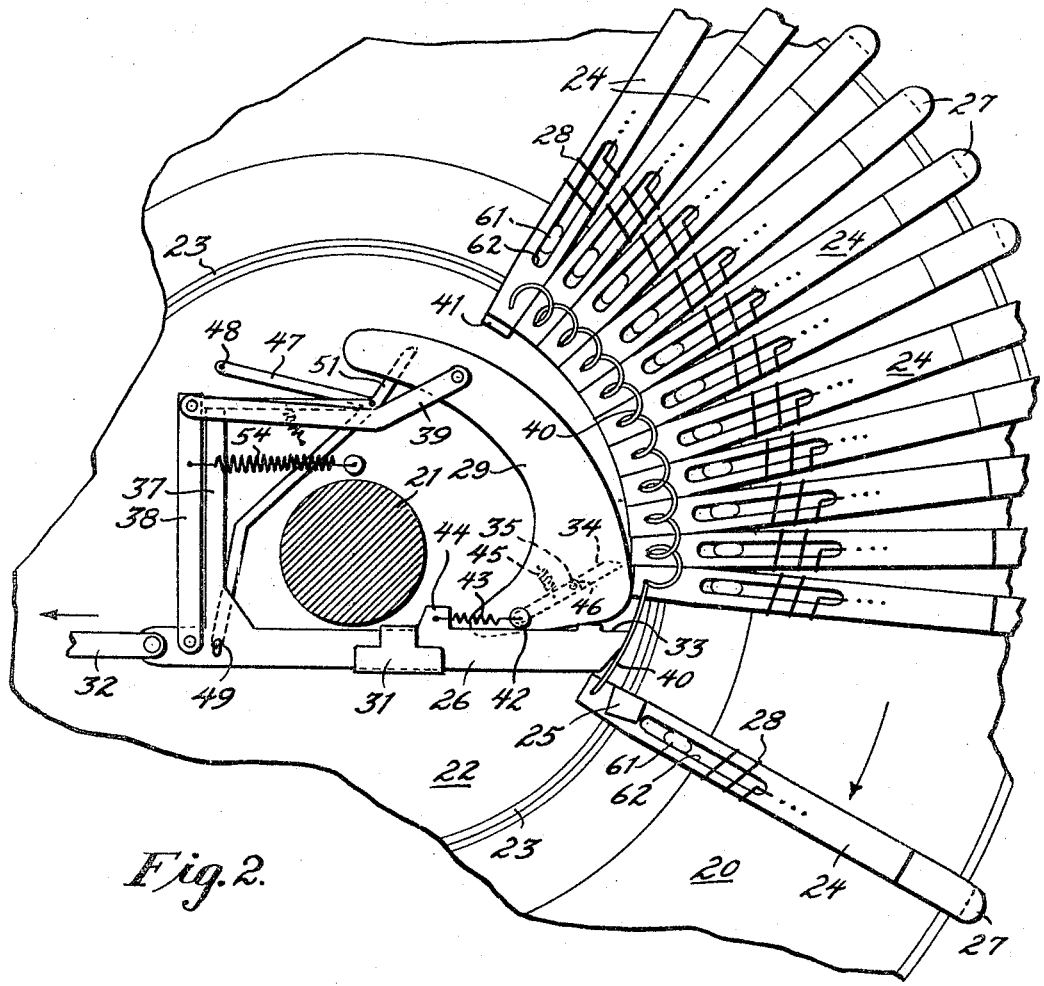
FIGURE 2 is a full view of the device similar to FIGURE 1 showing the mechanism activated with the first traction arm falling into place about the tire.

Engaging shoe 29 lodged against the inner end of the arms 24 keeps them out of contact with the tread surface of the tire 20 while in storage. To engage the system, the bar 26 riding in supporting member 31, which is attached to plate 22, is pulled backward toward the axle by operation of a lever within the car connected to the bar 26 through suitable linkage 32 while a solid link is shown, a flexible connection may also be used as the spring 54 can be used to pull the bar 26 back to its original position. The bar is now in the position as shown in FIGURE 2 with respect to the axle of the wheel. This movement of the bar pulls the end 33 away from the projection 25 on the first arm allowing it to fall, the movement of the arms spring 28 bringing it into contact with the tire. In addition, the movement of the bar 26 pulls the top end of shoe 29 rearward and away from engagement with the arms. The bottom end of the shoe being held in place by lever 34 acting on pin 35 attached to the plate 22. As shown more clearly in FIGURE 12, the vertical extension 37 of arm 26 works against the block 53 of control rod 38 which rod is pivotally connected to the bar 26 and pivotally connected to the shoe 29 by rod 39. The movement of bar 26 to the left will thus pull back the top of the shoe 29 to the position shown in FIGURE 2. As the top part of the shoe 29 moves rearward, the lower edge of the shoe moves upward so that the first traction arm 24 can fall into contact with the tread surface of the tire.

With the vehicle moving forward at this time, the first traction arm having fallen in contact with the wheel, the steel cable 40 which interconnects all the arms is pulled taut between the first and second arm. Further rotation of the tire will pull the second arm 24 off of the edge of the shoe 29 into contact with the tire. The cable being of such a length that for every thirty degrees of revolution of the tire a new arm will be pulled off thus placing them in spacial relationship about the tire as shown in FIGURE 3.

Arm mount 30 of the last traction arm, has an extension 41 attached thereto as shown in FIGURE 9. The other arm mounts do not have this extension. As this arm is pulled off the shoe, the extension trips the lever 34 taking it out of engagement with pin 35 which pin is attached to the plate 22. FIGURE 7 shows the extension 41 about to trip the lever 34. After it is released the lever 34 pivots about point 42 on the shoe 29. The spring 43 attached to the bar 26 pulls the bottom end of the shoe 29 rearward or to the left in the drawing so that it will not interfere with the arms when they are all in an operating position. The shoe is now in the position as shown in FIGURE 3, all the traction arms in contact with the tread surface thus providing the necessary traction elements.

Once the traction arms are placed into operation, the supporting mechanisms for these arms will not be under any substantial stress. For example, once the cable performs its functions of pulling the arms into position on the tire, it will no longer be under stress and any movement of the arms radially inward and outward will not be felt by the system, as this is absorbed by the springs 28. The arm mounts 30 have projections 61 which ride in slot 62 of the arms thus guiding their movement as they move radially.

The entire device has thus been put into operation by the mere movement of a lever the same being completed within one full revolution of the tire. When it is desired to disengage the unit, the operator of the vehicle merely releases the handle within the auto allowing or pushing the bar 26 back to its original position. Projection 44 on bar 26 pushes against the pin 42 on shoe 29 pushing the shoe in the same direction. Spring 45 which is attached to lever 34 exerts an upward force on this lever so that when its indentation 46 reaches the pin 35, the lever will be pulled up into contact with it, thus holding the shoe 29 in the proper position for stacking. The position of the shoe is now as shown in FIGURE 10, which position is identically similar to the position of the shoe as shown in FIGURE 2. The top end of the shoe is still held back by rod 51 so that the arms will come into contact with the shoe the next time around and ride up on it thus taking them out of contact with the tire. However, once the bar 26 has been pushed to the right, all of arms riding up on the shoe will be pulled off again by the cable until the first shoe with a projection is stopped by the bar. After this arm has been stopped, it will in turn stop each of the other arms, stacking them collectively for subsequent use.

Rod 47 is pivotally connected to the plate 22 at 48 and slidably and pivotally connected to the bar 26 at 49. (See FIGURE 12). This rod houses pivot point 50 about which lever arm 51 pivots. When the bar 26 is drawn back, the rod 47 pulls back with it which in turn pulls lever arm 51 down and out of any possible contact with the lever arm extension 41. In FIGURE 2, the tip of the lever arm 51 is shown below the level of the shoe 29. Spring 52 attached to lever 51 pulls the lever arm downward so that it rests on top of the vertical extension 37 and against the block 53 when the unit is in operation. The extension 37 on bar 26 pushes back the lever arm 38 as the bar is being pulled back thus pulling rearward the top of the shoe 29 as above described. Lever 51 keeps arm 38 there after the bar 26 is again pushed forward to disengage the system and stop the first of the traction arms. However, the movement of bar 26 forward also moves point 49 in the same direction which in turn pushes on rod 47 and moves pivot point 50 up thus pushing the tip of lever 51 back up into position to be contacted by the extension 41 of the last traction arm. When this arm presses the lever and trips the same, the lever, pivoting about point 50, lifts its opposite end out of contact with block 53 on rod 38. Spring 54 attached between the plate and the rod pulls the rod toward the axle which in turn pushes the shoe 29 through rod 39 back and up into contact with the ends of all the shoes as shown in FIGURE 1. The traction arms are all out of contact with the tire so that the system is now back to its storage position. To insure proper stacking of the arms, it is necessary that the operator travel forward at very slow speed for at least one revolution. However, this is not a serious fault since there is no element of safety or lack of safety involved.

Figure 5:
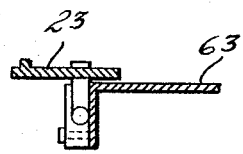
FIGURE 5 shows an alternative form for mounting the circular guiding ring member.
Figure 6:
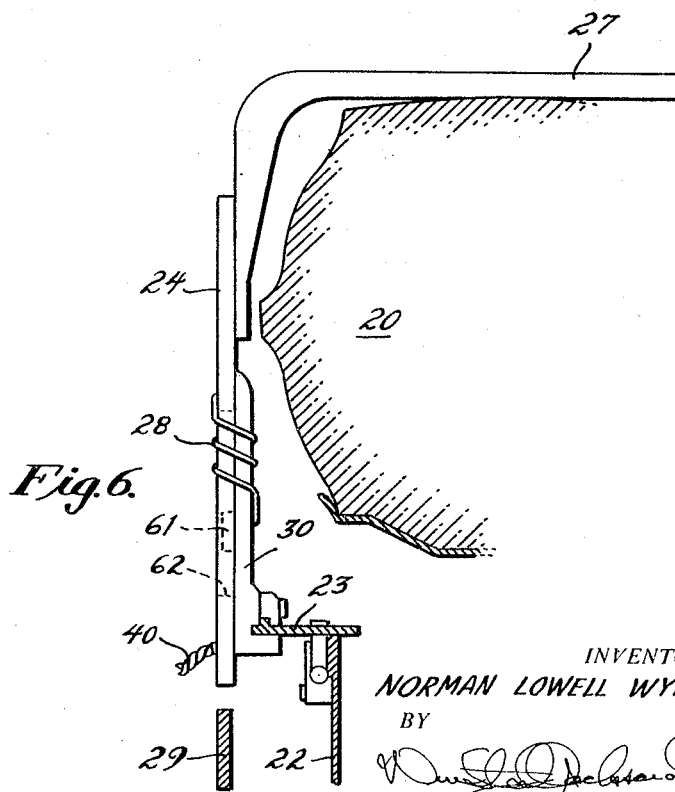
FIGURE 6 is an enlarged sectional view taken along the lines 6—6 of FIGURE 3 showing a traction arm in the operative position in contact with the tread surface of the tire.

The traction arm mounts 30 are slidably mounted to a circular rim 23 with an adjustable slip fit. The shanks of arms 24 are spring loaded onto the arm mount 30 by means of the spring 28 which is adjustable for various tension and tire sizes by means of a series of apertures 60 into which the spring 28 can be placed. The arm is free to move with respect to the arm mount by means of the projection 61 on the arm mount riding in the groove 62 of the arm. The circular rim or track can be mounted directly on the plate 22 by any suitable means as shown in FIGURE 4 which plate is attached to the axle. However, it might be preferable to use the alternate mount as shown in FIGURE 5 in which circular or ring track 23 is mounted on an adaptor 63 between the tire rim and a brake drum not shown. The bar 26, engaging shoe 29 and the control rod 38 would still be attached to the axle housing. The benefit of the alternate mount is that the bulk of the system can be removed easily from the vehicle for instance in the summer. The disadvantage of the alternate mount is that the bearing of the unit is operative when the arms are disengaged and inoperative only when the system is in use. For less friction in the overall system the traction arms may conveniently have ball or roller bearings mounted between the arm mounts and the circular track rather than the slip fit shown without departing from the scope of the invention.

The system may also be engaged while traveling in reverse. Here the operator pulls the handle slowly thereby lowering the upper end of the engaging shoe 29 slowly until the last traction arm contacts the tire. It moves rearward with the tire pulling the other arms off the engaging shoe in that direction with the cable. If done too quickly, more than one arm will come into contact with the tire at once and there will be a bunching of them but this is of no consequence as the motorist has gained the traction he needed to get out of a slick spot and all he needs to do to put the system in proper spacing is to release the handle while moving forward, then pull it back out again.

The system could easily be provided with a manual method of releasing the lower end of the engaging shoe so that it can be moved rearward and out of the way instead of using the spring biased tripping lever 34. This could be a cable arrangement like a choke cable and could conveniently be used where a motorist is stuck in a parking place with the system disengaged, with the need to engage the whole system but only being capable of moving a few feet forward and then backward, thus not being able to make a full revolution of the rear wheels. The system can operate just as well without the manual trip, but such a trip would mean less mechanical parts and consequently less wear on the system.

The drawings show a basic size for a standard brake drum and the system is so designed that it can easily be adjusted to serve all size vehicles. For large trucks and buses the units would be of the same in construction except the dimensions would be changed and more traction arms added so that there would always be at least one traction arm in contact with the road surface at all times.

In the drawings, the traction arm shanks are shown as straight pieces of metal. They could, however, conveniently be zigzag or V shaped so as to afford more contact area with the road surface and cover more area around the circumference of the tire. The ends coming into contact with the road could have a flat rubber belt attached to their arms studded with many steel spikes in order to get a smoother ride. Another system would be an arrangement of short lengths of chain that could cross the tread of the tire thus providing more traction than a straight steel bar element.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my invention.

Having thus described my invention what I claim as new and desire to secure by Letters Patent is:

1. A traction device in combination with a vehicle wheel comprising, a plurality of traction arms, a circular guiding member mounted adjacent to and about the axis of said wheel, said traction arms being slidably mounted on the guiding member and extending radially outward therefrom to the edge of and over the tread surface of the wheel, means for urging the arms radially inward into contact with the tread surface, a shoe engaged with the inner ends of said arms, said shoe keeping the arms out of contact with the tread surface, means for successively releasing said traction arms from engagement with said shoe while the wheel is rotating allowing the arms to move radially inward to contact the tread surface in spacial relationship and rotate with it thereby assuming an operative position, said means selectively bringing the shoe back into engagement with said arms thereby taking them out of contact with the tread surface to reassume an inoperative position, wherein the arms are interconnected at their inner radial ends with a cable and are collectively stacked adjacent one another along the guiding member while in an inoperative position, said releasing means allowing the first arm of the stack to fall into engagement with the tread surface, the remaining arms in the stack being successively pulled off the shoe and into engagement with the tread surface by reason of the interconnecting cable.

2. A traction device in combination with a vehicle wheel having a tread surface comprising, a circular guiding member mounted adjacent to and about the axis of said wheel, a plurality of traction arms slidably mounted on the guiding member and extending radially outward therefrom to the edge of and over the tread surface, means for urging the arms radially inward into contact with the tread surface, a shoe selectively engaged with the inner ends of said arms, for keeping the arms out of contact with the tread surface, means for successively releasing said traction arms from engagement with said shoe while the wheel is rotating whereby the arms move radially inward to contact the tread surface in spacial relationship and rotate with it and thereby assume an operative position, said means selectively bringing the shoe back into engagement with said arms thereby taking them out of contact with the tread surface to reassume an inoperative position, wherein the arms are interconnected at their inner radial ends with a cable and are collectively stacked adjacent one another along the guiding member while in an inoperative position, said releasing means allowing the first arm of the stack to fall into engagement with the tread surface, the remaining arms in the stack being successively pulled off the shoe and into engagement with the tread surface by reason of the interconnecting cable, and wherein said releasing means includes a mechanism activated by the last traction arm in the stack and to remove the shoe from interference with the arms while in the operative position, said mechanism upon similar activation returning the shoe to its original position when it is desired to subsequently remove the arms from engagement with the tread surface.

References Cited by the Examiner
UNITED STATES PATENTS

| | | | |
|---|---|---|---|
| 1,878,386 | 9/1932 | Douthitt | 152—214 |
| 2,427,510 | 5/1942 | Richardson | 152—214 |
| 2,581,770 | 1/1952 | Pittinger | 152—216 |

ARTHUR L. LA POINT, *Primary Examiner.*

C. W. HAEFELE, *Assistant Examiner.*